(12) United States Patent
Carter et al.

(10) Patent No.: US 7,520,013 B2
(45) Date of Patent: *Apr. 21, 2009

(54) PROCESS FOR ENHANCED LIQUID EXTRACTION FROM FABRICS

(75) Inventors: Daniel Larry Carter, Gainesville, FL (US); Dinesh Ochhavlal Shah, Gainesville, FL (US)

(73) Assignee: University of Florida Research Foundation, Inc., Gainseville, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/316,622

(22) Filed: Dec. 19, 2005

(65) Prior Publication Data

US 2006/0157088 A1 Jul. 20, 2006

Related U.S. Application Data

(60) Provisional application No. 60/637,318, filed on Dec. 17, 2004.

(51) Int. Cl.
*D06B 15/00* (2006.01)
(52) U.S. Cl. .............................. 8/148; 8/158
(58) Field of Classification Search .................. 8/148, 8/150; 68/205 R
See application file for complete search history.

(56) References Cited

U.S. PATENT DOCUMENTS

| | | | |
|---|---|---|---|
| 1,717,439 A * | 6/1929 | Duhamel ....................... 8/139 |
| 2,759,346 A * | 8/1956 | Beduhn ..................... 68/18 F |
| 3,962,798 A | 6/1976 | Jackson | |
| 3,982,325 A | 9/1976 | Sigl et al. | |
| 4,434,196 A * | 2/1984 | Robinson et al. ............ 427/389 |
| 4,810,253 A | 3/1989 | Kasprzak et al. | |
| 4,828,750 A * | 5/1989 | Simion et al. ................ 510/513 |
| 4,848,981 A | 7/1989 | Kasprzak et al. | |
| 5,203,927 A | 4/1993 | Yoshida et al. | |
| 5,626,916 A * | 5/1997 | Kishi et al. .................. 427/386 |
| 6,017,832 A * | 1/2000 | Yahiaoui et al. ............. 442/118 |
| 7,018,977 B2 * | 3/2006 | Martens et al. .............. 510/521 |

(Continued)

FOREIGN PATENT DOCUMENTS

EP 0455465 11/2001

(Continued)

OTHER PUBLICATIONS

Wang, Anfeng et al., "Direct Force Measurement of Comb Silicone Surfactants in Alcohol Media by Atomic Force Microscopy", Journal of Colloid and Interface Science, 242, 337-345 (2001).

(Continued)

*Primary Examiner*—Frankie L Stinson
(74) *Attorney, Agent, or Firm*—Akerman Senterfitt; Gregory A. Nelson; Gregory M. Lefkowitz

(57) ABSTRACT

A process of extracting liquid from a fabric having a first content of liquid includes the steps of creating a surfactant surface layer including at least one surfactant at an air-liquid interface of the liquid on the fabric, wherein the surface layer has a first surface tension, and adding at least one co-surfactant different from the surfactant. The surfactant and said co-surfactant have substantial chain length compatibility. The co-surfactant reduces the surface tension at the air-liquid interface. The fabric is then subjected to mechanical extraction for a period of time to reduce the liquid content of the fabric from the first content of liquid to a second liquid content.

13 Claims, 8 Drawing Sheets

Initial Solution    Super-saturation of Surface    Equilibrated Surface

U.S. PATENT DOCUMENTS

| | | |
|---|---|---|
| 7,026,278 B2 * | 4/2006 | Price et al. .................. 510/522 |
| 7,060,666 B2 * | 6/2006 | McHattie et al. ............. 510/466 |
| 2003/0050220 A1 * | 3/2003 | Trinh et al. .................. 510/521 |
| 2004/0255395 A1 * | 12/2004 | Zhang et al. .................... 8/159 |

FOREIGN PATENT DOCUMENTS

| EP | 0846334 | 11/2002 |
|---|---|---|
| FR | 2 522 007 A1 | 8/1983 |
| GB | 2 402 923 A | 2/2005 |
| WO | WO 84/01970 A | 5/1984 |
| WO | WO 97/08742 A1 | 3/1997 |
| WO | WO 03/022974 A | 3/2003 |
| WO | WO 2004/104148 A1 | 12/2004 |
| WO | WO 2004/113810 A | 12/2004 |

OTHER PUBLICATIONS

Shiao, S.Y. et al., "Chain Length Compatibility Effects in Mixed Surfactant Systems for Technological Applications" Advances in Colloid and Interface Science 74 (1998) 1-29.

Pabon, M. et al., "Fluorinated surfactants: synthesis, properties, effluent treatment", Journal of Fluorine Chemistry, 114 (2002) 149-156.

Patist et al., Effect of chain length compatibility on micellar stability in sodium dodecyl sulfate/alkyltrimethylammonium bromide solutions, Langmuir (1997) vol. 13, pp. 432-434.

Goncalves Da Silva et al., Synergism in mixed monolayers of cationic and anionic surfactants: a thermodynamic analysis of miscibility at the air-water interface, Colloids & Surfaces A: Physicochemical & Engineering Aspects (1998) vol. 144, pp. 191-200.

Ananthapadmanabhan et al., A study of the solution, interfacial and wetting properties of silicone surfactants, Colloids & Surfaces (1990) vol. 44, pp. 281-297.

Mukerjee et al., Fluorcarbon-hydrocarbon interactions in micelles and other lipid assemblies, at interfaces and in solutions, Colloids & Surfaces A: Physicochemical & Engineering Aspects (1994) vol. 84, pp. 1-10.

* cited by examiner

PROCESS FOR ENHANCED LIQUID EXTRACTION FROM FABRICS

CROSS-REFERENCE TO RELATED APPLICATIONS

This application claims the benefit of U.S. Provisional Application No. 60/637,318, filed Dec. 17, 2004, the entire disclosure of which is hereby incorporated by reference.

FIELD OF THE INVENTION

The present invention relates to a process of extracting liquid from a fabric using a surfactant system comprising a surfactant and a co-surfactant.

BACKGROUND OF THE INVENTION

The liquid content remaining in fabric, for example clothing, linens or the like, at the end of a washing cycle largely determines the time and energy required to dry consumer bundles of fabrics. The reduction of time and energy in drying laundry has been of great interest to consumers. A real challenge in drying laundry is to achieve the desired reduction in drying time and energy for an average consumer bundle of fabrics, which comprise various fabric types having different water retention properties.

Prior attempts to reduce liquid remaining in fabric at the end of a washing cycle have been directed to modification of fabric to be less absorbent or to affect the surface of the fabric by deposition of specified agents. However, modifying a fabric surface often leads to other undesired fabric properties and often fails to achieve the ideal reduction of drying time and energy desired by consumers. Therefore, there is a continuing need to effectively reduce the amount of liquid remaining in fabric such as clothing, linens and the like at the end of a washing cycle.

SUMMARY OF THE INVENTION

A process of extracting liquid from a fabric having a first content of liquid includes the steps of creating a surfactant surface layer comprising at least one surfactant at an air-liquid interface of the liquid on the fabric, wherein the surface layer has a first surface tension. At least one co-surfactant different from the surfactant is then added. The surfactant and co-surfactant have substantial chain length compatibility. The co-surfactant reduces the surface tension at the air-liquid interface to a reduced surface tension value. The fabric is then subject to mechanical extraction for a period of time to reduce the liquid content of the fabric from the first content of liquid to a second liquid content. In one embodiment the surfactant includes a cationic or anionic surfactant, and the co-surfactant is oppositely charged to include the other of the cationic or anionic surfactant. In another embodiment, the co-surfactant comprises a non-ionic surfactant and the surfactant comprises an ionic surfactant. In yet another embodiment, the co-surfactant comprises a ionic surfactant and the surfactant comprises a non-ionic surfactant. The co-surfactant can be added in a solution comprising an organic solvent, such as an alcohol. In a particular embodiment, the surfactant comprises sodium tetradecyl sulfate and dioctyldecyldimethylammonium bromide in a molecular ratio of from about 1:10 to about 1:3; and the co-surfactant is delivered through a solution which comprises about 1 mM to about 5 mM sodium tetradecyl sulfate.

The reduced surface tension value can be from 0.5 mN/m to 3 mN/m. In a preferred embodiment, the reduced surface tension value is between 0.5 and 1.0 mN/m. In one embodiment, the process is performed in a washing machine, preferably the washing machine preferably dispensing the surfactant solutions automatically at predetermined times.

BRIEF DESCRIPTION OF THE DRAWINGS

While the specification concludes with claims particularly pointing and distinctly claiming the present invention, it is believed that the same will be better understood from the following description taken in conjunction with the accompanying drawings in which:

Figure 1A:
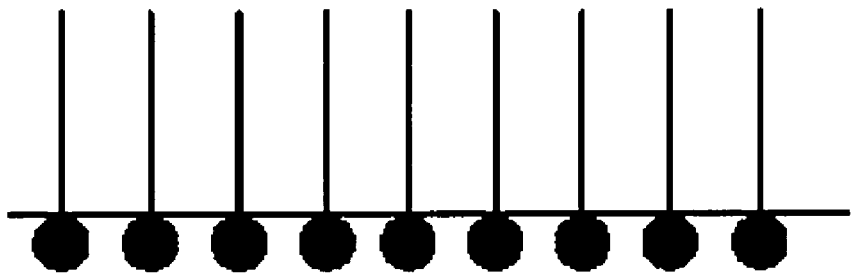
FIGS. 1A-1C are schematic illustrations of transient surface tension mechanisms of the present invention.

The embodiments set forth in the drawings are illustrative in nature and not intended to be limiting of the invention defined by the claims. Moreover, individual features of the drawings and the invention will be more fully apparent and understood in view of the detailed description.

DETAILED DESCRIPTION OF THE INVENTION

Incorporated and included herein, as if expressly written herein, are all ranges of numbers when written in a "from X to Y" or "from about X to about Y" format. It should be understood that every limit given throughout this specification will include every lower, or higher limit, as the case may be, as if such lower or higher limit was expressly written herein. Every range given throughout this specification will include every narrower range that falls within such broader range, as if such narrower ranges were all expressly written herein.

A process of extracting liquid from a fabric having a first content of liquid comprises the steps of creating a surfactant surface layer comprising a surfactant at an air-liquid interface of the liquid on the fabric, wherein the surface layer has a first surface tension. At least one co-surfactant different from the surfactant is added, wherein the surfactant and co-surfactant have substantial chain length compatibility. The surfactant and co-surfactant are preferably oppositely charged. The co-surfactant reduces the surface tension at the air-liquid interface for a period of time. The fabric is then subjected to mechanical extraction during the period of time to reduce the liquid content of the fabric from the first content of liquid to a second liquid content. Both the surfactant and co-surfactant can each comprise two (2) or more surfactants.

The inventors have surprisingly discovered that by introducing a suitable second surfactant (or cosurfactant) into a bulk solution having an article (e.g. fabric) whose surface is coated by a surfactant layer provides an interaction with the surfactant layer which results in a decrease the surface tension of the first surfactant. The resulting surface tension provided by the surfactant and co-surfactant is lower than the surface tension that can be achieved by either of the surfactants individually. The interaction is believed to be an electrostatically-based Coulombic Interaction. Although the interaction can be provided by mechanically penetrating the surface layer of the first surfactant, such as using a syringe which was used in some of the initial proof of concept experiments performed, the Inventors have discovered that simply adding an appropriate cosurfactant to the bulk solution can generally produce the desired reduction in surface tension, removing the need for mechanically introducing the cosurfactant under the surfactant layer. This allows the invention to scale up, including use in washing machines.

In a preferred embodiment, the surfactant and co-surfactant are oppositely charged surfactants. However, the surface tension reduction has been shown to occur using anionic and nonionic surfactant pairs. For example, surface tension reduction has been demonstrated using a long chain alcohol surface layer by dodecyl or tetradecyl sulfate surfactant molecules.

Although the surface layer is described herein as generally being a surfactant layer, the surface layer can comprise other types of coatings. For example, the coating can be predominantly unsaturated solid alcohols of the steroid group, such as cholesterol and ergosterol. Examples regarding cholesterol surface layers are described in the Examples below.

Surfactants are generally classified by the presence of formally charged groups in its head. A nonionic surfactant has no charge groups in its head. The head of an ionic surfactant carries a net charge. If the charge is negative, the surfactant is more specifically called anionic. If the charge is positive, it is called cationic. If a surfactant contains a head with two oppositely charged groups, it is termed zwitterionic.

As used herein, the phrase "said surfactant and said co-surfactant being oppositely charged" is defined as the surfactant/co-surfactant providing a cationic/anionic pair, or a zwitterionic with either another zwitterionic, or an anionic or cationic surfactant, such that an electrostatic attraction exists between the surfactant and the co-surfactant. However, as noted above, surface tension lowering interactions have been observed for certain non-ionic/ionic surfactant pairs. Suitable non-ionic surfactants tend to be species which provide a significant dipole, or are capable of having a significant dipole induced, such as by an ionic surfactant.

Preferred surfactant systems according to the invention provide surfactants that have electrostatic and/or hydrophobic interactions that create a synergistic effect to significantly reduce the surface tension at the air-liquid interface. Moreover, improved electrostatic attraction has been found to result when there is "substantial chain length compatibility" between the respective surfactants. As defined herein, "substantial chain length compatibility" refers to surfactants that are within 8 carbon units between them. The use of a co-surfactant that is closer to the length of the main surfactant generally enhances the synergistic effect of chain length compatibility so that an electrostatic attraction exists along with the chain lengths of the two surfactants to enhance the chain-chain interaction between the two surfactants. In a preferred embodiment, the chain length difference is <6, more preferably <4, and most preferably <2.

In one embodiment of the invention, the surfactant and co-surfactant are utilized during the washing process, which is commonly accomplished through the use of a washing machine having a mechanical extraction means such as a spin stage. As used herein "a reduced second liquid content" means a liquid content that would be less than that achieved by use of a mechanical extraction means alone (just water), measured as being at least a 10% reduction in residual moisture content (RMC). In a preferred embodiment the RMC reduction is at least 20%, and in a most preferred embodiment at least 30% reduction.

As used herein "fabric" refers to natural, synthetic, and mixed natural/synthetic materials, including but not limited to silk, wool, cotton, rayon, nylon, polyesters, lycra, and spandex.

As used herein "liquid" refers to any aqueous bases material that can have a liquid form at room temperatures (about 0° C. to about 60° C.) or can comprise a mixture of liquid and vapor phases at ambient temperatures and pressures, e.g., at 25° C. and 101 kPa (1 atm) pressure. As used herein "liquid" further refers to a pure liquid, a solution, or a colloid suspension of solids in an aqueous material, such as water.

As used herein "liquid content" refers to the liquid held interstitially in a fabric weave or structure such as void spaces. The liquid content may range from saturated to dry. "Dry" as used herein refers to fabric that has no damp feel when touched. "Saturated" as used herein refers to fabric that has the maximum liquid content of the fabric.

As used herein, an "effective amount" refers to an amount of a material or additive that when utilized delivers a perceivable benefit, such as the amount of water extracted from fabric.

The washing process of a typical washing machine comprises the following stages. First the washing machine, after being loaded with the desired fabrics, has a "washing stage," which, as used herein, refers the stage where the washing machine fills with water to a predetermined volume, agitates for a specified period of time, drains the washing liquor, and then the machine spins the fabrics. "Rinse stage" as used herein refers the next stage wherein the washing machine fills with water to a predetermined volume, agitates for a specified period of time, and then drains the water as the machine spins the fabrics. During the washing stage and rinse stage, fabrics become wet with the wash liquor and have a first liquid content. During the spinning and draining portion of the rinse stage, some washing machines have a small amount of water dropping onto the fabric. "Splash" as used herein refers to water dropped onto the fabrics during the rinse stage, but not retained or held in the washing machine. After the rinse stage, a type of mechanical extraction means to further remove the liquid content from the fabrics may be used. It is intended that the claimed process of the present invention encompass mechanical extraction means separate from a washing machine as well as mechanical extraction means incorporated as part of the washing machine. The "spin stage" as used herein, refers to a stage wherein the washing machine incorporates a mechanical extraction means. A reduced second liquid content may be measured at the end of the spin stage. One exemplary embodiment comprises a washing machine spin cycle for a specified period of time without the addition of water to the washing machine.

The surfactant surface layer utilized in the present process may be created at the air-liquid interface of the liquid content held interstitially in a fabric weave or structure such as void spaces at any time during the washing process. In one exemplary embodiment, the surfactant surface layer is created at the air-liquid interface during the washing stage. In another exemplary embodiment, the surfactant surface layer is created at the air-liquid interface during the rinse stage. In an alternative embodiment, the surfactant surface layer is created at the air-liquid interface immediately prior to any mechanical extraction, such as, immediately prior to the spin stage. In yet another alternative embodiment, the surfactant surface layer is created at the air-liquid interface during the splash portion of the rinse stage. In still yet another embodiment of the present invention, the surfactant surface layer may be created at the air-liquid interface during the spin stage. In one exemplary embodiment, the surfactant surface layer is created by the addition of a one dose form at any of these stages.

Likewise, the co-surfactant may be added at any time during the washing process. In one exemplary embodiment, the co-surfactant is added after the surfactant monolayer has been created. In another exemplary embodiment, the co-surfactant is contacted with the fabric having a first liquid content during the washing stage. In another exemplary embodiment, the co-surfactant is contacted with the fabric having a first liquid content during the rinse stage. In an alternative embodiment, the co-surfactant is contacted with the fabric having a first liquid content immediately prior to any mechanical extraction, for example in one exemplary embodiment, immediately prior to the spin stage. In yet another alternative embodiment, the co-surfactant is contacted with the fabric having a first liquid content during the splash portion of the rinse stage. The co-surfactant may be added in a one dose form at any of these stages.

The interaction of the surfactant layer with the co-surfactant during any of these stages is believed to result in a reduced second liquid content of the fabric when the mechanical extraction means is applied. As one skilled in the art will appreciate, the co-surfactant may be located in the liquid content (i.e., the liquid held interstitially in a fabric weave or structure such as void spaces). In an alternative embodiment, the co-surfactant is applied onto the fabric during one of the stages of the washing process.

The process can further comprise the step of subjecting the fabric to mechanical drying, air-drying, or a combination thereof. As used herein "air drying" includes indoor or outdoor drying, such as line drying. Exemplary mechanical drying means include vacuum drying or heat drying such as that which occurs in commercial or in-home drying machines.

Without being limited by a theory, it is believed that the role of surface tension at the air-liquid interface is a key aspect in the present process. A reduction in the amount of liquid content during the spin cycle of the washing process is believed to correspond to a reduction in drying time of a fabric. It is believed that by decreasing the surface tension of the air-liquid interface, more liquid content can be removed from the fabric while applying the same centrifugal force in the spin cycles of washing process.

The liquid content is directly proportional to the surface tension at the air-liquid interface of the wash liquor. For traditional surfactant systems, as the concentration of the surfactant is increased, the surface tension at the air-liquid interface is lowered until the solution critical micelle concentration (CMC) is reached. After the CMC is reached, the surface tension at the air-liquid interface typically remains constant. While again not intending to be bound by theory, the liquid content should follow this trend (i.e., lower until CMC is reached and then remain constant after the CMC of the surfactant is reached) since it is believed that liquid content typically decreases as surface tension decreases.

As noted above, once the CMC is reached, the surface tension at the air-liquid interface typically remains constant. The lowest equilibrium air-liquid surface tension achieved with fluorosurfactants and/or siloxane surfactants is approximately 15-20 mN/m. For other common typical surfactants, the air-liquid surface tension is higher, typically above 20 mN/m. The present invention comprises a process of extracting liquid from a fabric by creating a surface tension at the air-liquid interface significantly lower than that of these common typical surfactants. Without being limited by theory, it is believed that a decrease in surface tension of the air-liquid interface is achieved by creating a surfactant surface layer and then interacting with the surface layer with a co-surfactant.

The surface layer can be a monolayer. As used herein, the term "monolayer" refers to a one molecule thick adsorbed layer of surfactant at an interface. In the case of a monolayer adsorbed at an air-liquid interface, the surface tension can be significantly altered. In the present invention, in the case of monolayer formation the monolayer is at the air-liquid interface of the liquid content.

Figure 1B:
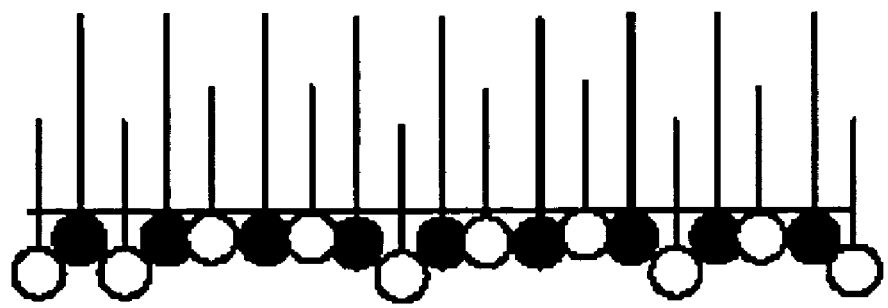
Figure 1C:
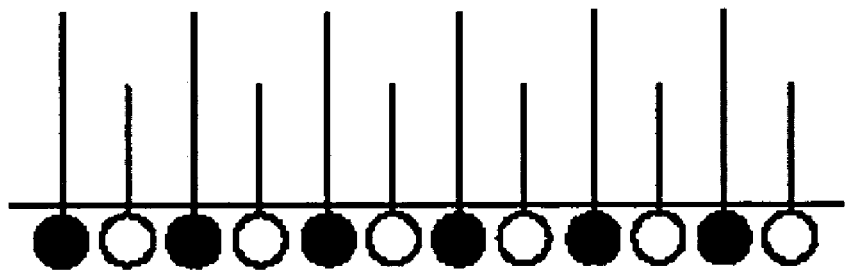

In one exemplary embodiment, the surfactant surface layer is created by dissolving a surfactant in solvent and then spreading the dissolved surfactant over the air-liquid interface of the liquid content. The solvent then evaporates and the surfactant reaches an equilibrium and forms a surface layer as shown in FIG. 1A. As noted by S. Y. Shaiao et al., *Advances in Colloid and Interface Science*, 74 (1998) 1-29, the addition of a surfactant with mismatched chain lengths to a surfactant monolayer, can result in the excess hydrocarbon tails disrupting the molecular packing and creating a supersaturation period which can lead to lower interaction energies and a resulting decrease in surface tension (FIG. 1B). As the air-liquid interface equilibrates (FIG. 1C), the surface tension increases. Without being limited to a theory, it is believed that due to the surface activity of the surfactants, the air-liquid interface can become super saturated and then equilibrate.

In one exemplary embodiment of the present invention, the surface tension of the air-liquid interface is decreased after the co-surfactant interacts with the surfactant surface layer for a period of time ranging from about 10 seconds to about 3,000 seconds. In an alternative embodiment, the surface tension is decreased by the present process for a period of time comprising at least 300 seconds, alternatively for a period of time comprising at least 900 seconds. In yet another alternative embodiment, the surface tension is decreased for a period of time comprising at least 1,000 seconds.

Surfactant Surface Layer

In one embodiment, the surfactant surface layer and co-surfactant used in the process of the present invention are capable of reducing the surface tension of the liquid content to a range of from about 20 mN/m to about 1 mN/m; in an alternative embodiment, from about 10 mN/m to about 1 mN/m, and in a further exemplary embodiment, from about 5 mN/m to about 1 mN/m. Without being limited by theory, it is believed that the reduction in surface tension of the liquid content trapped by capillary forces interstitially in the fabric weave or in void spaces (i.e., liquid content), results in larger volumes of the liquid content being removed from the fabric by the same amount of mechanical extraction. Unlike prior techniques for reducing residual water in fabric, the surfactant surface layer and co-surfactant are not required to be deposited or attached to the fabric surface or fiber after the rinse cycle. Therefore, the surfactant surface layer and co-surfactant of the present invention encompass benefit agents that are not required to modify the surface properties of the fabric, but rather modify the properties of the liquid in the fabric fibers (i.e., liquid content). In one exemplary embodiment, the surfactant surface layer and co-surfactant do not result in excessive foaming as they are added during the washing process and the fabric does not need to be further contacted with additional liquid to eliminate any foaming that results there from.

In one embodiment, selection of a surfactant surface layer optimizes surface tension reduction with the least amount of material added into the laundry process under common consumer conditions. While not being limited to a theory, it is believed that a mixed surface layer may form tighter packing in the surface layer due to electrostatic interactions between headgroups. In one exemplary embodiment, the surfactant is sufficiently dispersible in the predetermined volume of liquid in the washing stage or the rinse stage so that an effective amount of surfactant surface layer is created throughout a consumer bundle of fabric.

In one exemplary embodiment of the present invention, the surfactant monolayer and the co-surfactant are oppositely charged. While not be limited to a theory, it is believed that the opposite charges result in tighter packing which leads to lower surface tension at the air-liquid interface.

Surfactants—Exemplary surfactant and co-surfactant components according to the present invention may comprise a surfactant or surfactant system comprising one or more surfactants selected from nonionic, anionic, cationic, ampholytic, zwitterionic, and/or semi-polar nonionic surfactants, other adjuncts such as alkyl alcohols, or mixtures thereof. Non-limiting examples of anionic surfactants include, mid-chain branched alkyl sulfates, modified linear alkyl benzene sulfonates, alkylbenzene sulfonates, linear and branched chain alkyl sulfates, linear and branched chain alkyl alkoxy sulfates, and fatty carboxylates. Non-limiting examples of nonionic surfactants include alkyl ethoxylates, alkylphenol ethoxylates, and alkyl glycosides. Other suitable surfactants include amine oxides, quaternery ammonium surfactants, and amidoamines.

Anionic Surfactants

Nonlimiting examples of anionic surfactants useful herein include: $C_8$-$C_{18}$ alkyl benzene sulfonates (LAS); $C_8$-$C_{22}$ primary, branched-chain and random alkyl sulfates (AS); $C_8$-$C_{22}$ secondary (2,3) alkyl sulfates; $C_8$-$C_{22}$ alkyl alkoxy sulfates ($AE_xS$) wherein x is from 1-30; $C_8$-$C_{22}$ alkyl alkoxy carboxylates comprising 1-5 ethoxy units; mid-chain branched alkyl sulfates as discussed in U.S. Pat. No. 6,020,303 and U.S. Pat. No. 6,060,443; mid-chain branched alkyl alkoxy sulfates as discussed in U.S. Pat. No. 6,008,181 and U.S. Pat. No. 6,020,303; modified alkylbenzene sulfonate (MLAS) as discussed in WO 99/05243, WO 99/05242 and WO 99/05244; methyl ester sulfonate (MES); and alpha-olefin sulfonate (AOS). One exemplary anionic surfactant is sodium tetradecyl sulfate ($C_{14}SO_4$).

Nonionic Surfactants

Non-limiting examples of nonionic surfactants include: $C_8$-$C_{22}$ alkyl ethoxylates, such as, NEODOL® nonionic surfactants from Shell; $C_6$-$C_{12}$ alkyl phenol alkoxylates wherein the alkoxylate units are a mixture of ethyleneoxy and propyleneoxy units; $C_8$-$C_{22}$ alcohol and $C_6$-$C_{12}$ alkyl phenol condensates with ethylene oxide/propylene oxide block alkyl polyamine ethoxylates such as PLURONIC® from BASF; $C_{14}$-$C_{22}$ mid-chain branched alcohols, BA, as discussed in U.S. Pat. No. 6,150,322; $C_{14}$-$C_{22}$ mid-chain branched alkyl alkoxylates, $BAE_x$, wherein x 1-30, as discussed in U.S. Pat. No. 6,153,577, U.S. Pat. No. 6,020,303 and U.S. Pat. No. 6,093,856; Alkylpolysaccharides as discussed in U.S. Pat. No. 4,565,647 Llenado, issued Jan. 26, 1986; specifically alkylpolyglycosides as discussed in U.S. Pat. No. 4,483,780 and U.S. Pat. No. 4,483,779; Polyhydroxy fatty acid amides (GS-base) as discussed in U.S. Pat. No. 5,332,528; and ether capped poly(oxyalkylated) alcohol surfactants as discussed in U.S. Pat. No. 6,482,994 and WO 01/42408.

Cationic Surfactants

Non-limiting examples of cationic surfactants include: the quaternary ammonium surfactants, which can have up to 26 carbon atoms include: alkoxylate quaternary ammonium (AQA) surfactants as discussed in U.S. Pat. No. 6,136,769; dimethyl hydroxyethyl quaternary ammonium as discussed in U.S. Pat. No. 6,004,922; polyamine cationic surfactants as discussed in WO 98/35002, WO 98/35003, WO 98/35004, WO 98/35005, and WO 98/35006; cationic ester surfactants as discussed in U.S. Pat. Nos. 4,228,042, 4,239,660 4,260, 529 and U.S. Pat. No. 6,022,844; and amino surfactants as discussed in U.S. Pat. No. 6,221,825 and WO 00/47708, specifically amido propyldimethyl amine (APA).

Zwitterionic Surfactants

Non-limiting examples of Zwitterionic (amphoteric) surfactants include Dodecyl betaine, Dodecyl dimethylamine oxide, Cocamidopropyl betaine, Cocamide MEA, cocamide DEA, and cocamide TEA.

Surface Active Polymers

Besides the non-polymer surfactants described above, surfactants according to the invention can also be surface active polymers. surface active polymers can include, for example, polyethylene oxide (PEO), polyacrylic acid (PAA), polyacryamide (PAM), polyvinylalcohol (PVA) and polyalkylamine (PAH).

Adjunct Materials

The co-surfactant may further include adjuncts materials to deliver further benefits other than fast drying of the fabrics. The precise nature of these additional components, and levels of incorporation thereof, will depend on the physical form of the co-surfactant and the nature for which it is to be used. Suitable adjunct materials include, but are not limited to, chelating agents, dye transfer inhibiting agents, dispersants, enzymes, and enzyme stabilizers, brighteners, suds suppressors, dyes, perfumes, structure elasticizing agents, fabric softeners, anti-abrasion agents, carriers, hydrotropes, processing aids and/or pigments, and other fabric care agents. In addition to the disclosure below, suitable examples of such other adjuncts and levels of use are found in U.S. Pat. Nos. 5,576, 282, 6,306,812 B1 and 6,326,348 B1.

Surface Tension Adjuncts

It may be desired in the present invention to use surface tension adjuncts which assist in achieving the desired results of the present invention and aid in the performance of the surfactant surface layer and co-surfactant system. Without being limited by a theory, such adjuncts can improve the packing of the co-surfactant with the surfactant surface layer at the desired interface (e.g., water/air).

Suds Suppressors

It may be desired in the present invention to use suds suppressors to prevent excess foaming. As used herein "excess foaming" refers to the formation of visible foams on clothes at the end of rinse, or the resulted foam (suds) hindering the spinning action of the washer drum, an phenomenon referred as "suds locking". A wide variety of materials may be used as suds suppressors, and suds suppressors are well known to those skilled in the art. See, for example, Kirk Othmer Encyclopedia of Chemical Technology, Third Edition, Volume 7, pages 430-447 (John Wiley & Sons, Inc., 1979). The present invention may also contain non-surfactant suds suppressors. These include, for example: high molecular weight hydrocarbons, N-alkylated amino triazines, monostearyl phosphates, silicone suds suppressors, secondary alcohols (e.g., 2-alkyl alkanols) and mixtures of such alcohols with silicone oils. Hydrocarbon suds suppressors are described, for example, in U.S. Pat. No. 4,265,779, issued May 5, 1981 to Gandolfo et al. Silicone suds suppressors are well known in the art and are, for example, disclosed in U.S. Pat. No. 4,265,779, issued May 5, 1981 to Gandolfo et al and EP 354 016. Mixtures of alcohols and silicone oils are described in U.S. Pat. Nos. 4,798,679, 4,075,118 and EP 150,872. Additional examples of all of the aforementioned suds suppressors may be found in WO00/27958.

In one exemplary embodiment of the present invention, the surfactant surface layer comprises a single surfactant. Exemplary surfactants include hexadecyl trimethyl ammonium bromide ($C_{16}TAB$); didodecyldimethylammonium bromide (DDAB); and dioctyldecyldimethylammonium bromide (DODAB). In another embodiment of the present invention, the surfactant surface layer comprises a mixed surfactant system. Exemplary mixed surfactant layers comprise sodium tetradecyl sulfate ($C_{14}SO_4$) with DODAB. In one exemplary embodiment of the present invention, the mixed surfactant surface layer comprises a molecular ratio of the $C_{14}SO_4$: DODAB in the surface layer ranging from about 1:10 to about 10:1.

In an alternative embodiment, the molecular ratio of the $C_{14}SO_4$:DODAB in the surface layer ranges from about 1:10 to about 1:3. One specific exemplary molecular ratio of $C_{14}SO_4$:DODAB in the surface layer is about 1:5.

In another embodiment of the present invention, the co-surfactant comprises an anionic surfactant. One exemplary anionic co-surfactant is sodium tetradecyl sulfate ($C_{14}SO_4$). In one exemplary embodiment, the co-surfactant comprises a concentration of from about 0.1 mM to about 50 mM $C_{14}SO_4$; alternatively, the concentration of the co-surfactant ($C_{14}SO_4$) is about 4 mM.

In one embodiment of the present invention, the amount of co-surfactant delivered is from about 0.1 mmol to about 5 mmol for each $m^2$ of the total liquid surface area in the fabric; alternatively, the amount of the co-surfactant delivered is about 3.3 mmol for each $m^2$ of the total liquid surface area in the fabric.

In one exemplary embodiment, the surfactant surface layer component(s) are dissolved into one or more solvents. As one skilled in the art will appreciate, any compatible solvents may be utilized in the present invention which allows the surfactant surface layer to be created on the air-liquid interface of the liquid in the fabric. Exemplary solvents are generally organic solvents, such as ethanol, isopropanol, methanol, chloroform, hexane. The organic solvents can be mixed with water. It is understood that the use of any of these solvents may be limited by compatibility with the device and conditions of the application.

In one exemplary embodiment, in a washing machine system, the co-surfactant may be present in a laundry detergent, a fabric softener or it can be added as part of the one of the washing stages, such as the rinse or spin stage. In one exemplary embodiment, the surfactant surface layer is sprayed or otherwise delivered onto the fabrics during the spin stage allowing a surfactant surface layer to be created on the air-liquid interface of the liquid content. In another exemplary embodiment, the surfactant surface layer is created during the spin stage.

As will be appreciated by one skilled in the art, the present invention can be useful for removing liquid from surfaces other than fabrics, such as in oil recovery and in drying surfaces of semiconductors, ceramics, metals, glasses, plastics, silicon wafers and laser disks. One exemplary embodiment of the present invention comprises a method of removing liquid from a surface having a first amount of liquid. The method comprises: creating a surfactant surface layer at an air-liquid interface of the liquid on the surface, wherein the surfactant surface layer has a first surface tension and is free of fluorosurfactants or silicone surfactants; adding a co-surfactant free of fluorosurfactants or silicone surfactants to the surfactant surface layer with reduce the first surface tension at the air-liquid interface for a period of time; and subjecting the surface to mechanical extraction during the period of time to reduce the first amount of liquid to a second amount of liquid.

Another exemplary embodiment of the present invention is a process of reducing the surface tension of a liquid. The process comprises: creating a surfactant surface layer at an air-liquid interface of the liquid, wherein the surfactant surface layer has a first surface tension and is free of fluorosurfacants or silicone surfactants; and adding a co-surfactant free of fluorosurfacants or silicone surfactants surfactant surface layer to reduce the first surface tension from about 17.5 mN/m to about 1 mN/m at the air-liquid interface for a period of time.

Novel washing machines designs can conveniently implement the invention. Washing machine s according to the invention comprise at least one reservoir, and generally at least two reservoirs, to hold a surfactant solution. A processor or sequencer determines appropriate times to dispense the respective surfactant solutions. The surfactants can be gravity fed, or pumps provided if gravity feeding is not desired. In an exemplary embodiment, the fabric to be washed is added to the washer. The fabric is then presoaked by automatically dispensing the first surfactant solution along with water, such as SDS. A high speed spin cycle is then started to remove some of the water. While at high speed in the spin cycle, a second surfactant solution is then automatically dispensed, such as 0.1 wt. % DODAB and $C_{14}SO_4$ in ethanol.

EXAMPLES

It should be understood that the Examples described below are provided for illustrative purposes only and do not in any way define the scope of the invention.

Test Methods

The surface tension measurements of the present invention are made using the Wilhelmy Plate method. The output from a gram-force sensor holding the plate is sent to a transducer and then output to a voltage readout. The system calibrates using two known solutions (water at 72.5 mN/m and acetone at 23 mN/m). The platinum plate is heated using a torch between each reading to clean off any surface impurities. To measure residual moisture content (RMC), a fabric sample is first weighed while dry; and then the fabric sample is soaked for ten minutes in solution and centrifuged for ten minutes. The centrifuge tube has a copper insert. The copper insert has one closed end and one flared end to prevent it from falling into the centrifuge tube. The copper insert has 3/16 inch holes through it to allow water to drain through the insert into the collection tube.

After centrifuging the fabric, the weight is taken to determine the Residual Moisture Content (RMC). The surface tension measurements of monolayer penetration are made using the same the Wilhelmy Plate method above, with the exception of collecting the voltage output using a data acquisition card available from DATAQ Instruments, which allows measuring and recording surface tension as a function of time (approximately 40 times per second).

Example 1

Figure 2:
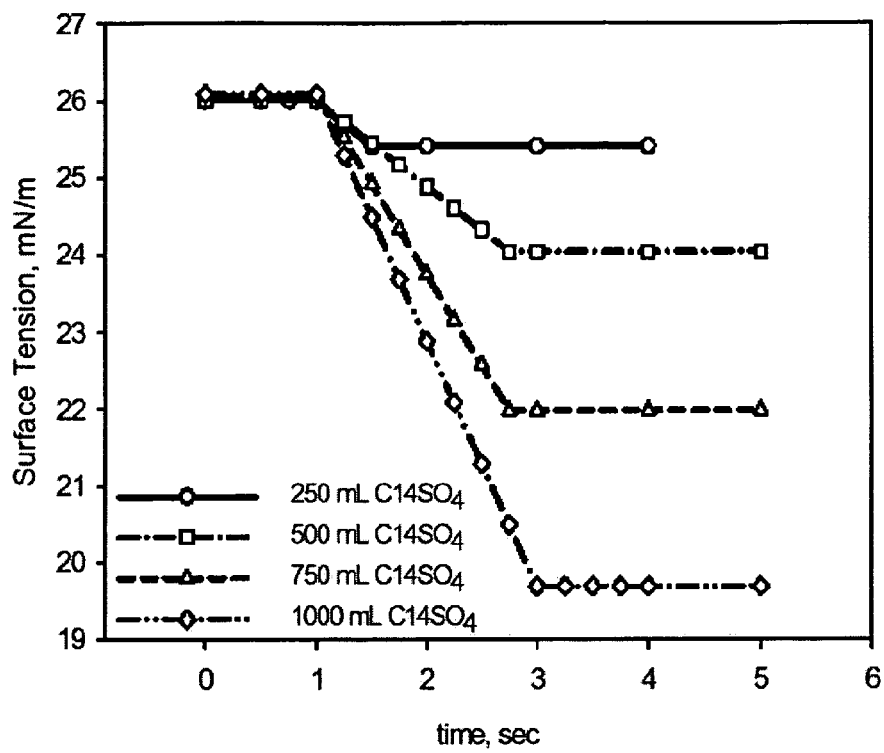
FIG. 2 sets forth surface tension properties of a surfactant system comprising sodium tetradecyl sulfate ($C_{14}SO_4$) added to a solution of hexadecyl trimethyl ammonium bromide ($C_{16}TAB$) according to a first exemplary embodiment of the present invention.

In this experiment, sodium tetradecyl sulfate ($C_{14}SO_4$) co-surfactant is used together with a solution of hexadecyl trimethyl ammonium bromide ($C_{16}TAB$). A solution of 3.68 mM hexadecyl trimethyl ammonium bromide ($C_{16}TAB$) was prepared. Using 10 mL of the $C_{16}TAB$ solution, different amounts (250 µL, 500 µL, 750 µL and 1000 µL) of 4 mM $C_{14}SO_4$ were injected beneath the air-liquid interface of the $C_{16}TAB$ solution and the surface tension is measured (approximately 40 times per seconds) as a function of time as set forth in FIG. 2. The lowest surface tension achieved is ~20 mN/m. While not limited by a theory, it is believed that since the $C_{16}TAB$ is in bulk solution and does not form a surface layer, and any $C_{14}SO_4$ injected into the system immediately interacts with the bulk surfactant instead of partitioning the air-liquid interface.

Example 2

Figure 3:
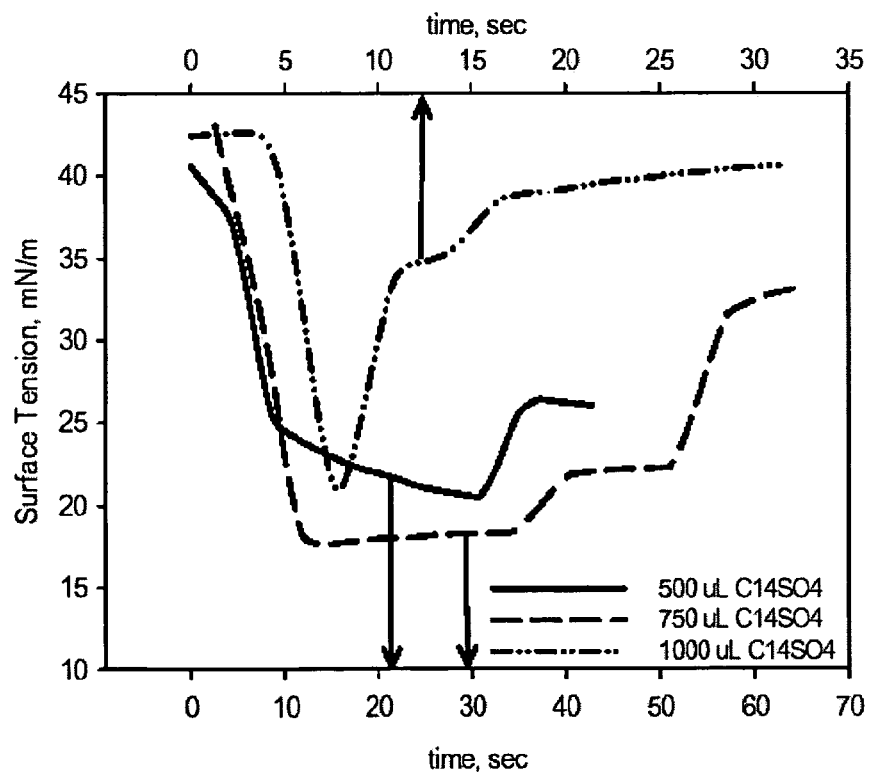
FIG. 3 sets forth surface tension properties of a surfactant system comprising $C_{14}SO_4$ added to $C_{16}TAB$ according to a second exemplary embodiment of the present invention.

In this experiment, a $C_{16}TAB$ surface layer was created on distilled water and increasing amounts of $C_{14}SO_4$ are injected beneath the surface layer and the surface tension is measured (approximately 40 times per second) as a function of time. The surface layer was created by first solubilizing 0.1 wt % of $C_{16}TAB$ in a mixture of 3:1:1 volume ratio of hexane to chloroform to methanol. Five µL of the resulting solution was placed on the surface of 5 mL of distilled water. The solvent (hexane, chloroform and methanol) was allowed to evaporate, thus leaving a $C_{16}TAB$ monolayer. Increasing amounts (250 µL, 500 µL, 750 µL and 1000 µL) of 4 mM $C_{14}SO_4$ were then injected beneath the monolayer and the surface tension is measured as a function of time as set forth in FIG. 3. A transient low surface tension of 17.5 mN/m was achieved for about 20 seconds using 750 L of 4 mM $C_{14}SO_4$.

While not limited by a theory, it is believed that once the $C_{14}SO_4$ is injected into the solution, supersaturation of the surface with both $C_{16}TAB$ and $C_{14}SO_4$ causes the surface tension to decrease. Then as the solution equilibrates, the surface tension increases.

Figure 4:
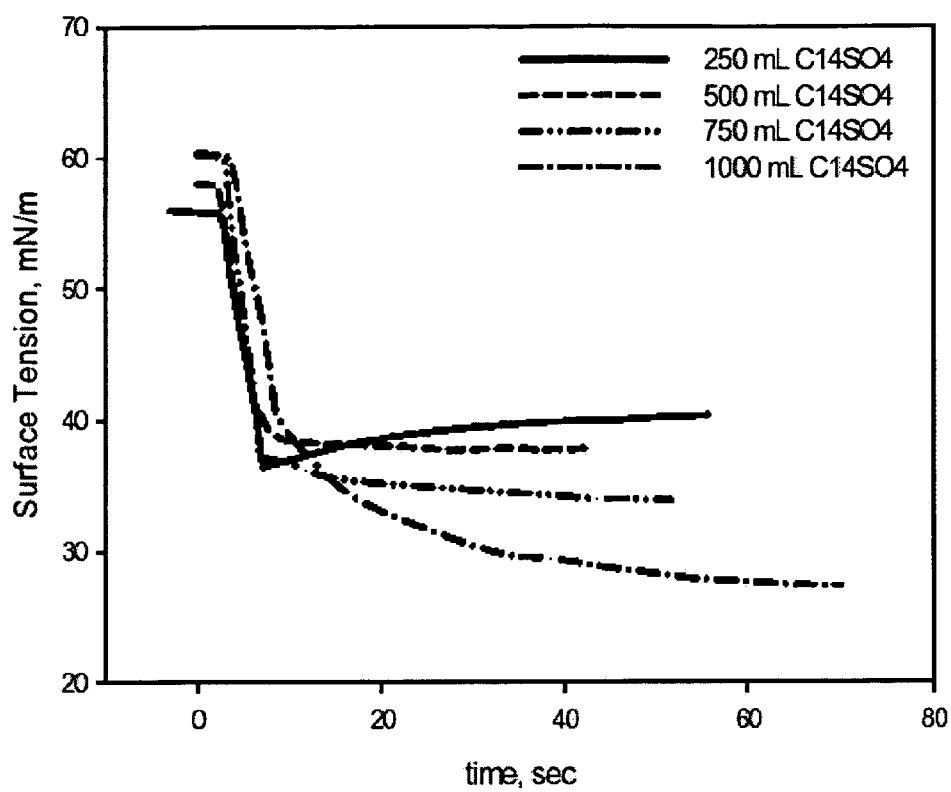
FIGS. 4-7 set forth surface tension properties of exemplary surfactant systems comprising $C_{14}SO_4$ added to various surfactants according to third, fourth, fifth and sixth, respectively, exemplary embodiments of the present invention.
Figure 5:
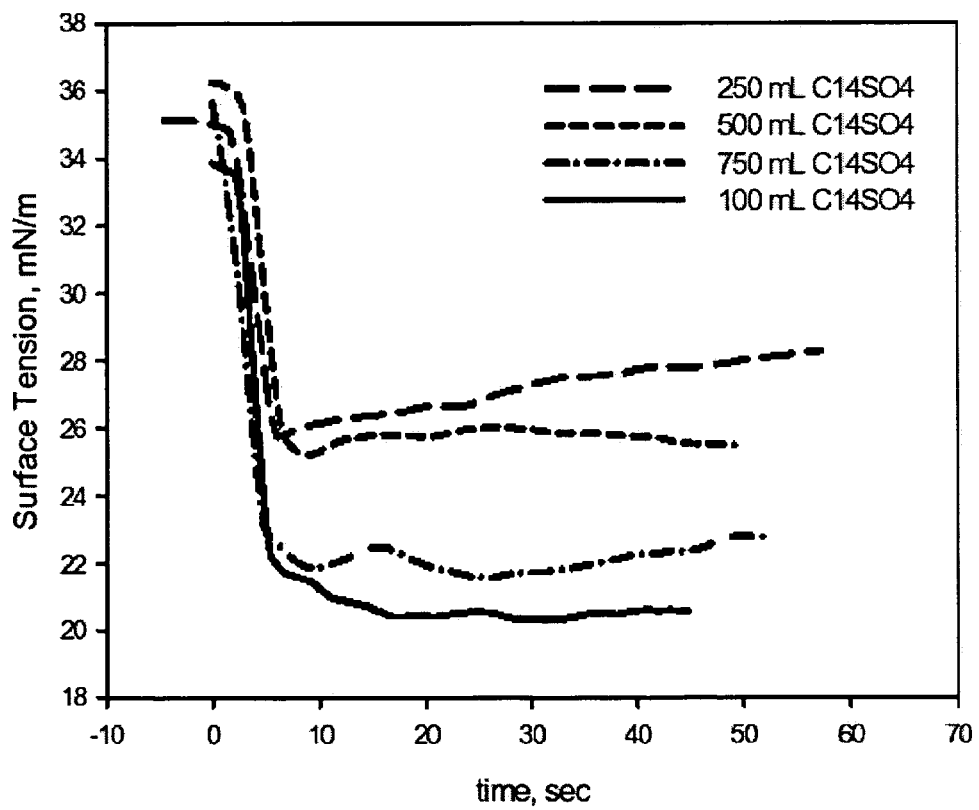
Figure 6:
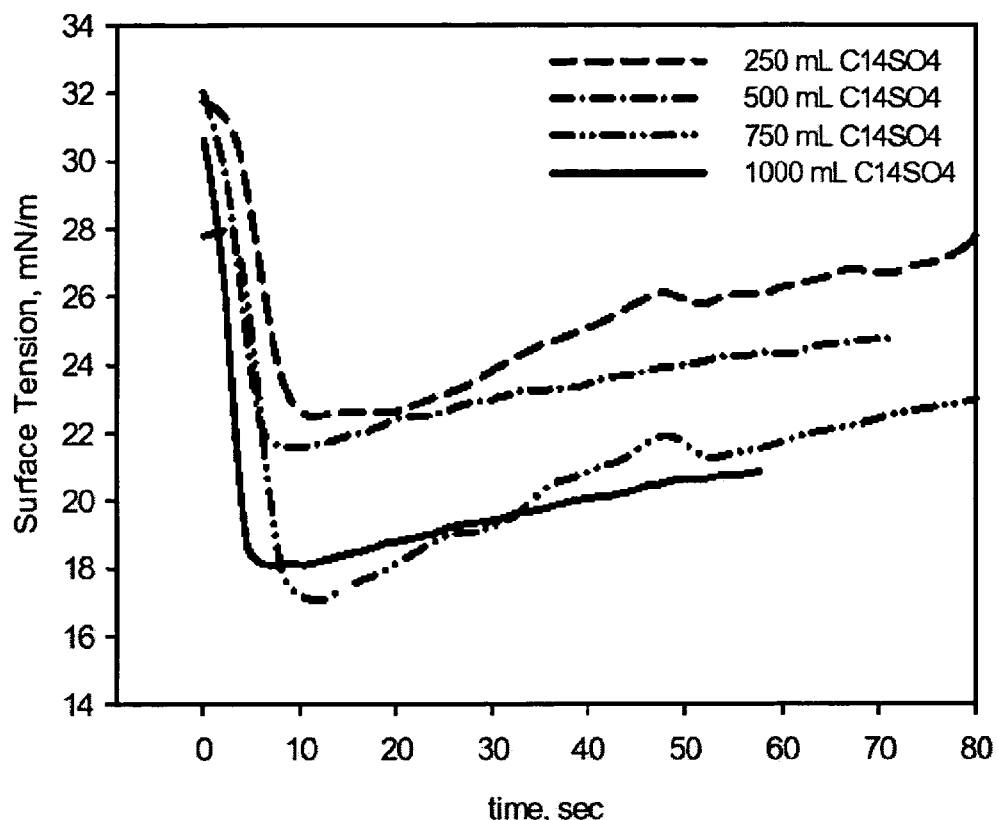
Figure 7:
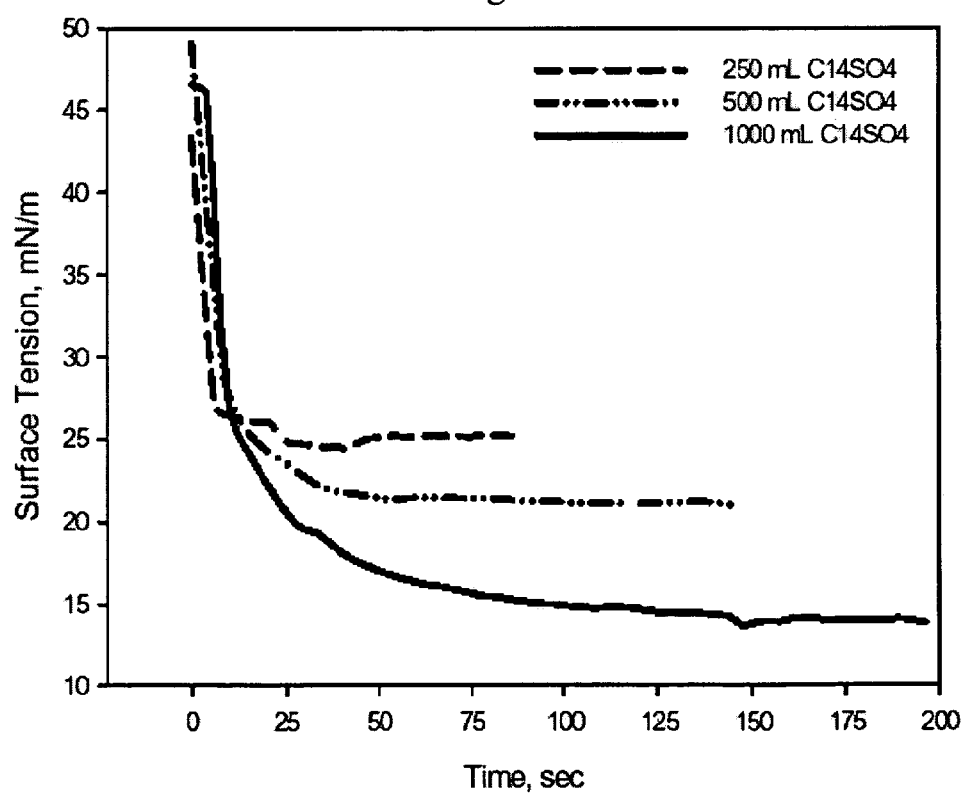
Figure 8:
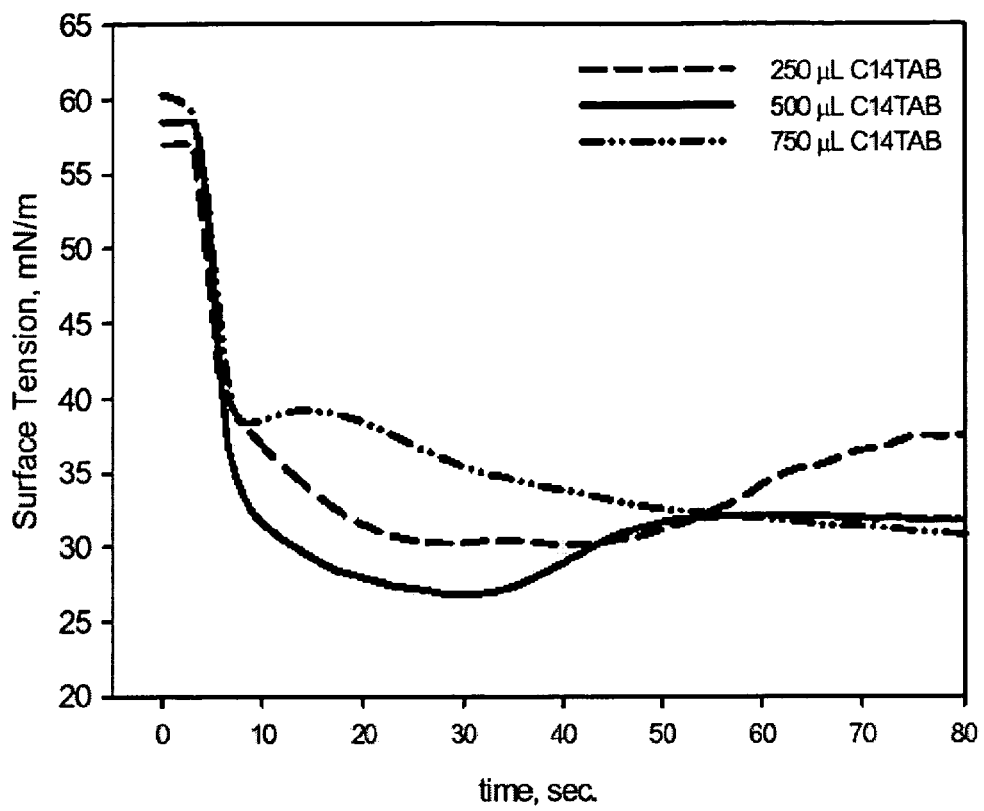
FIG. 8 sets forth surface tension properties of a surfactant system comprising 25 tetradecyltrimethyl ammonium bromide added to stearic acid according to a seventh exemplary embodiment of the present invention.

Additional surfactant monolayers were also investigated. FIG. 4 sets forth the surface tension for $C_{14}SO_4$ added to interact with a surface layer of arachidyl alcohol ($C_{20}OH$); FIG. 5 sets forth the surface tension for $C_{14}SO_4$ interacting with a cholesterol surface layer; FIG. 6 sets forth the surface tension for $C_{14}SO_4$ interacting with a surface layer of didodecyldimethylammonium bromide monolayer (DDAB); and FIG. 7 sets forth the surface tension for $C_{14}SO_4$ interacting with a surface layer of dioctyldecyldimethylammonium bromide (DODAB). FIG. 8 sets forth the surface tension for tetradecyltrimethyl ammonium bromide ($C_{14}TAB$) interacting with a stearic acid surface layer. As shown in these Figures, the lowest surface tension occurs with charged surfactants that are essentially insoluble in water. In systems where the surface layer is slightly soluble, the surfactant leaves the air-liquid interface and the surface tension increases. When the surface layer is insoluble, the surfactant stays at the air-liquid interface and attracts the oppositely charged surfactant and causes a large change in the surface tension (~13.5 MN for the $C_{14}SO_4$ & DODAB system).

Example 3

In this experiment, mixed surfactant surface layers are demonstrated and the packing due to electrostatic interactions between the headgroups of the surfactants is observed. A tetradecyl sodium sulfate ($C_{14}SO_4$) with dioctyldecyldimethylammonium bromide (DODAB) was employed. Molecular ratios of 1:10, 1:5, 1:3, and 1:2 of the $C_{14}SO_4$:DODAB monolayers were investigated. The procedures for preparing the surface layers are similar to those described in Example 2.

Figure 9:
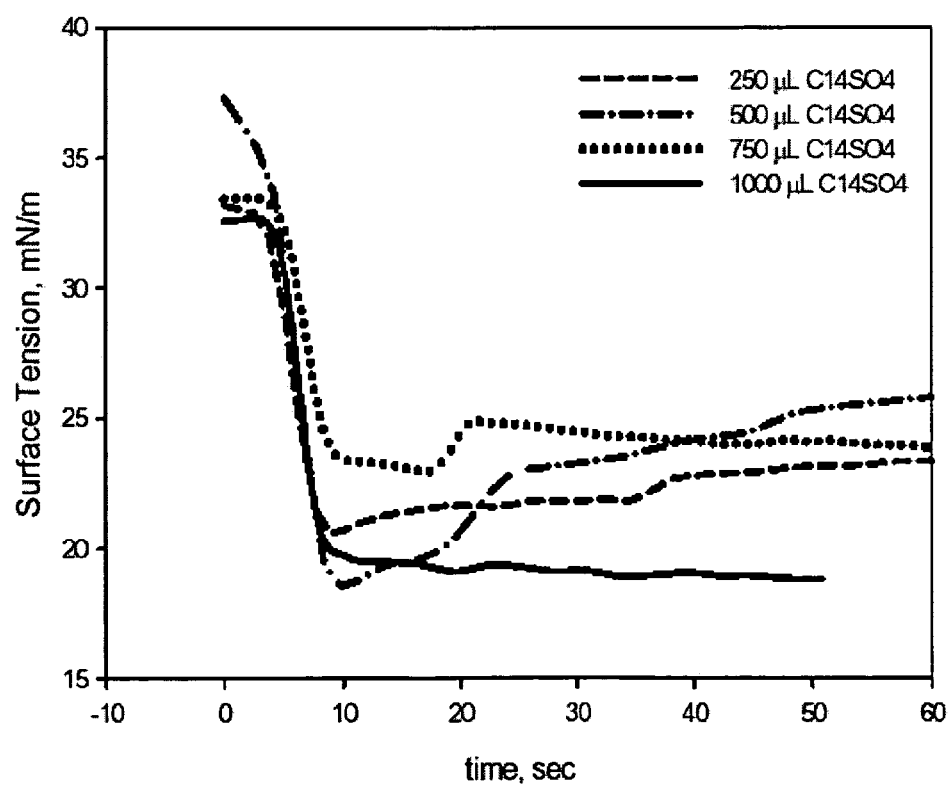
FIG. 9 sets forth surface tension properties of a surfactant system comprising $C_{14}SO_4$ added to a 1:10 molecular ratio $C_{14}SO_4$:dioctyldecyldimethylammonium bromide (DODAB) monolayer according to an eighth exemplary embodiment of the present invention.
Figure 10:
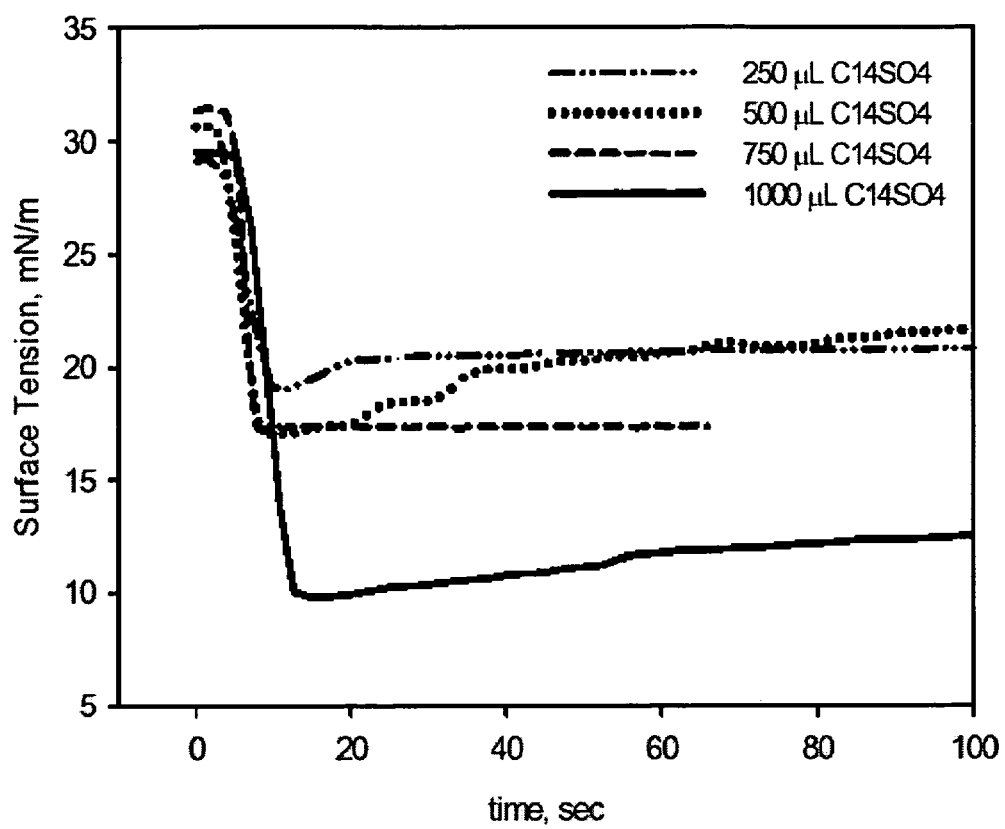
FIG. 10 sets forth surface tension properties of a surfactant system comprising $C_{14}SO_4$ added to a 1:5 molecular ratio $C_{14}SO_4$:dioctyldecyldimethylammonium bromide (DODAB) monolayer according to a ninth exemplary embodiment of the present invention.

FIG. 9 sets forth the results for the 1:10 molecular ratio of $C_{14}SO_4$:DODAB surface layer injected with $C_{14}SO_4$. As shown, the 1:10 molecular ratio of $C_{14}SO_4$:DODAB surface layer system results in a surface tension as low as 19 mN/m. FIG. 10 sets forth the results for the 1:5 molecular ratio of $C_{14}SO_4$:DODAB surface layer injected with $C_{14}SO_4$. As shown, in the 1:5 molecular ratio of $C_{14}SO_4$:DODAB surface layer, the surface tension drops to approximately 8.5 mN/m with 1000 L of $C_{14}SO_4$ injected beneath the surface layer.

Figure 11:
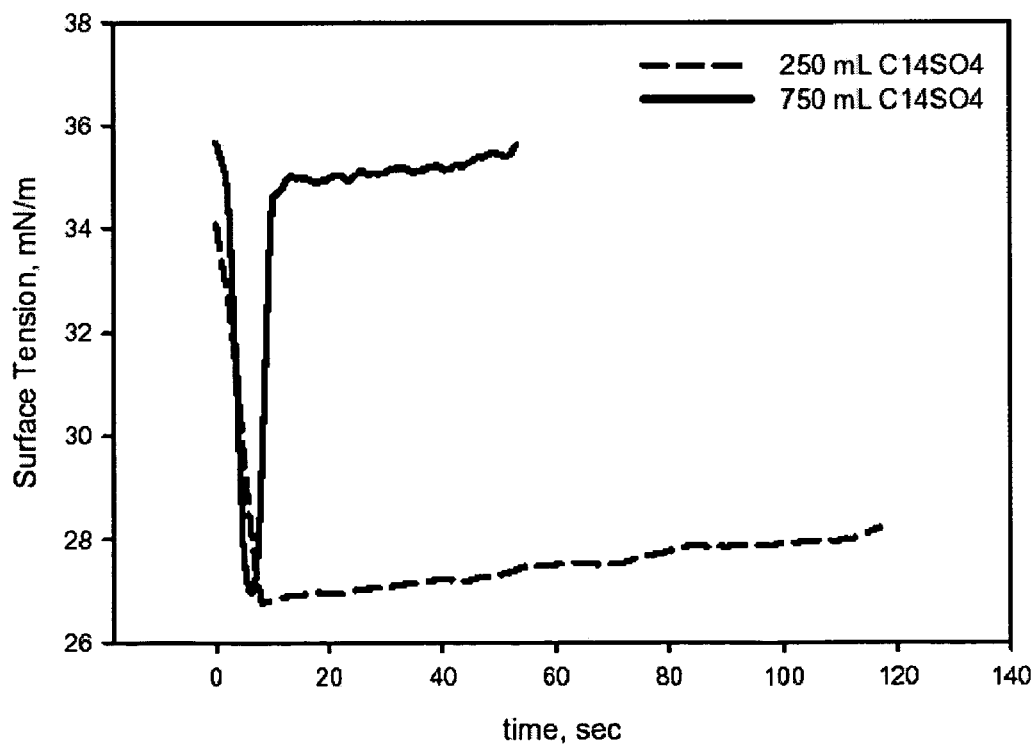
FIG. 11 sets forth surface tension properties of a surfactant system comprising $C_{14}SO_4$ added to a 1:3 molecular ratio $C_{14}SO_4$:dioctyldecyldimethylammonium bromide (DODAB) monolayer according to a tenth exemplary embodiment of the present invention.
Figure 12:
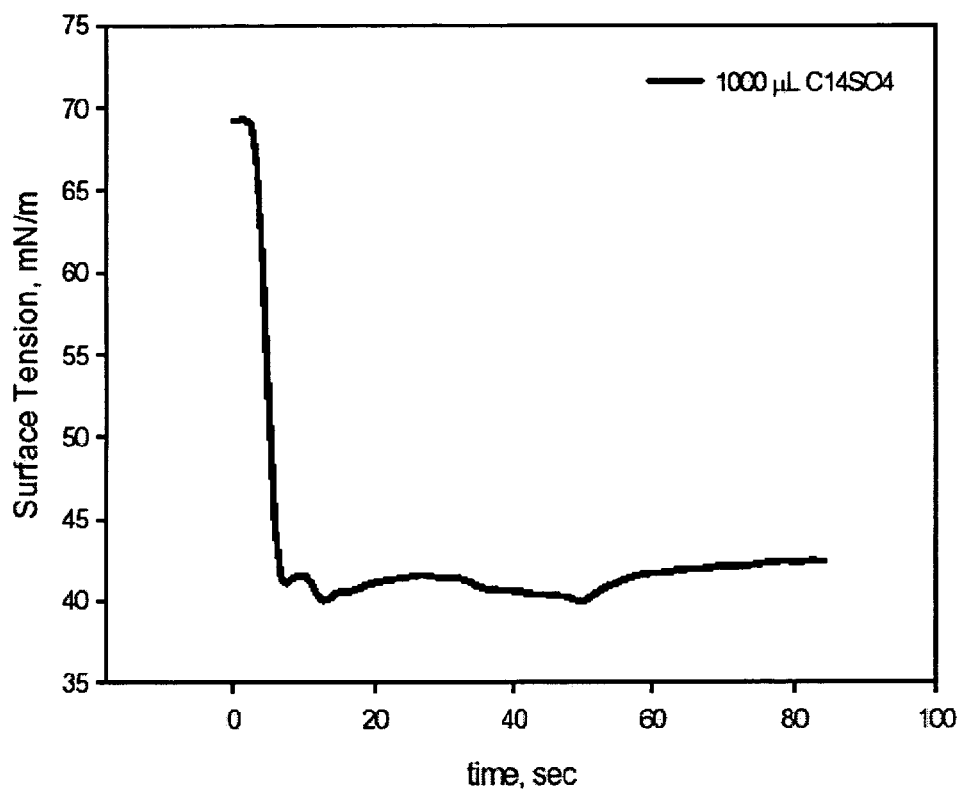
FIG. 12 sets forth surface tension properties of a surfactant system comprising $C_{14}SO_4$ added to a 1:2 molecular ratio $C_{14}SO_4$:dioctyldecyldimethylammonium bromide (DODAB) monolayer according to an eleventh exemplary embodiment of the present invention.

Tight packing for the $C_{14}SO_4$:DODAB surface layer occurs at a 1:3 molecular ratio. FIG. 11 sets forth the results for the 1:3 molecular ratio of $C_{14}SO_4$:DODAB surface layer injected with $C_{14}SO_4$. As shown, the minimal surface tension for the 1:3 molecular ratio $C_{14}SO_4$:DODAB system is not as low as the 1:5 molecular ratio $C_{14}SO_4$:DODAB. While not being limited by theory, it is believed that this is due to the molecular packing trying to achieve the 1:3 molecular ratio. At a lower ratio of $C_{14}SO_4$:DODAB (the 1:5 system) there is somewhat tight packing. This packing can be optimized by the addition of more $C_{14}SO_4$ beneath the surface layer. The addition of the 4 mM $C_{14}SO_4$ results in what is believed to be a 1:3 molecular ratio of $C_{14}SO_4$:DODAB in the surface layer after the addition of the $C_{14}SO_4$ beneath the surface layer. However, when the surface layer is already at its tightest packing at a 1:3 molecular ratio of $C_{14}SO_4$:DODAB, it is believed that there is not sufficient room for more $C_{14}SO_4$ to penetrate the surface layer resulting in a higher surface tension than the 1:5 molecular ratio systems. As shown in FIG. 12, when higher ratios (1:2) of $C_{14}SO_4$:DODAB is tested, there is no surface layer present after spreading the universal solvent. Since the $C_{14}SO_4$ is soluble in water, once the surface layer is spread on the distilled water, it is solubilized into solution due to the increased amount of $C_{14}SO_4$ which results in a higher surface tension (approximately the surface tension of water) that reduces with the addition of $C_{14}SO_4$.

Example 4

Figure 13:
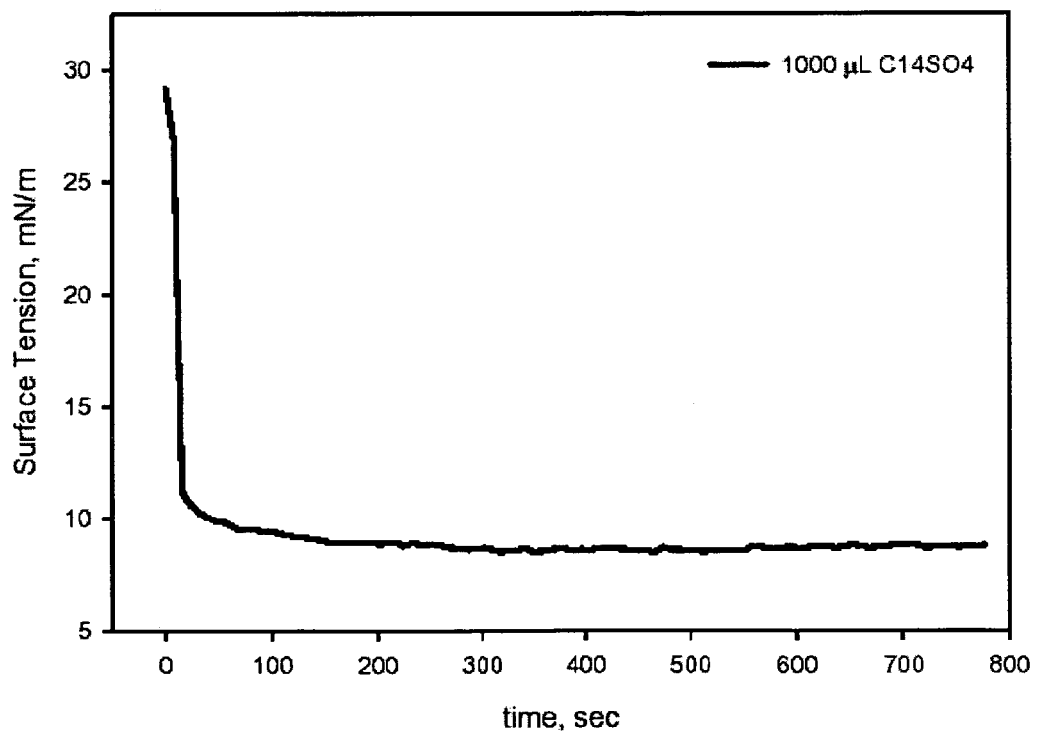
FIG. 13 sets forth surface tension properties of a surfactant system comprising $C_{14}SO_4$ added to a 1:5 molecular ratio $C_{14}SO_4$:dioctyldecyldimethylammonium bromide (DODAB) monolayer according to a twelfth exemplary embodiment of the present invention.

In this experiment, the 1:5 molecular ratio of $C_{14}SO_4$:DODAB surface layer from Experiment Three was further investigated. Using a 1:5 molecular ratio of $C_{14}SO_4$:DODAB monolayer with 1000 L of 4 mM $C_{14}SO_4$ as the co-surfactant, experiments were performed for longer times periods with five repetitions as set forth in FIG. 13. A minimum surface tension of ~8.5 mN/m is achieved for time periods of over 700 seconds (~12 minutes).

Example 5

Figure 14:
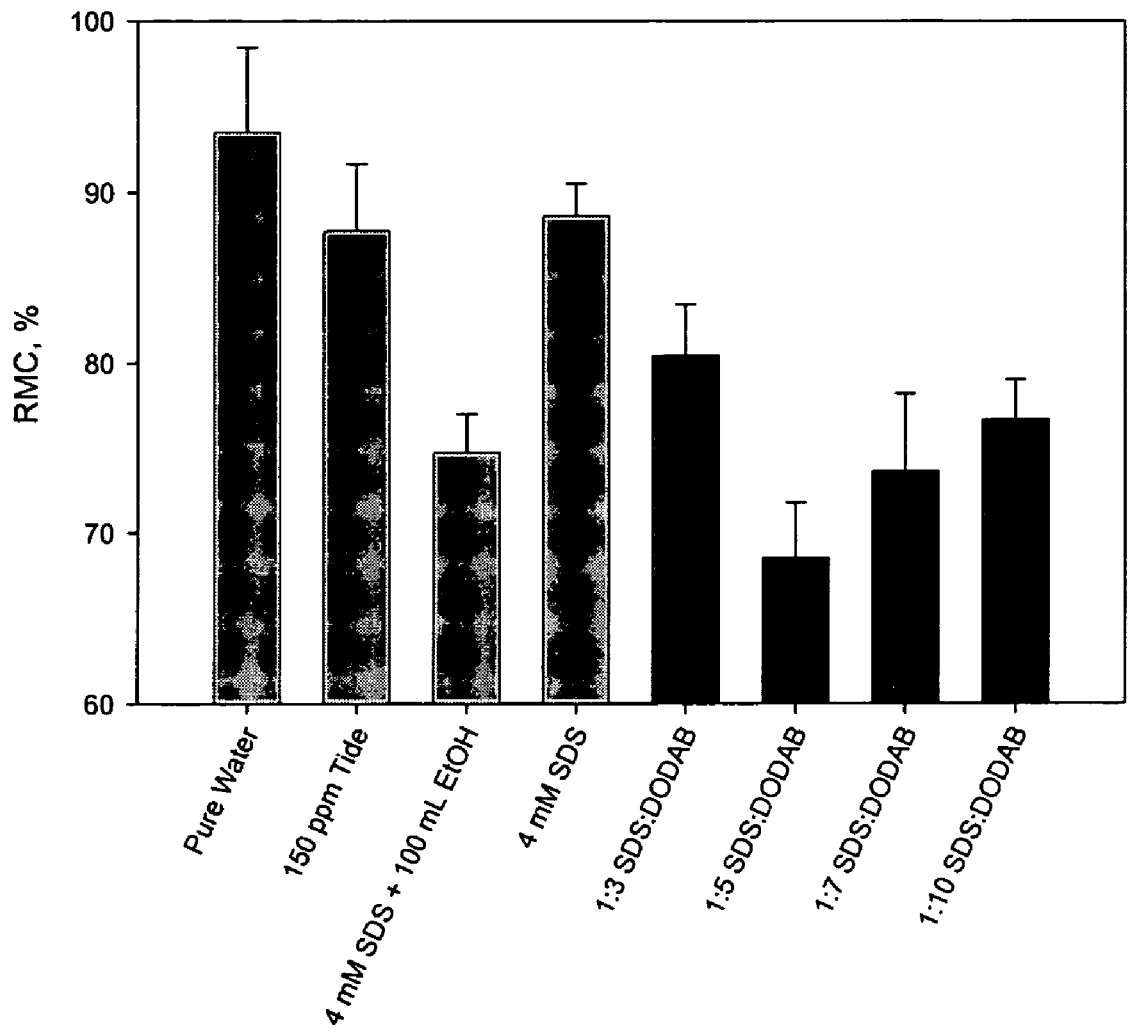
FIG. 14 sets forth residual moisture content (RMC) results demonstrating one embodiment of the invention significantly reducing the RMC as compared to various controls.

This example, unlike Examples 1-4 which were small scale studies, were repeated on a large scale in a household washing machine. Cotton fabric was first soaked in 4 mM solutions of SDS. The fabric was then placed in the washing machine and the final spin cycle was started. After the machine reached full centrifugation speed, 100 mL of another surfactant solution 0.1 wt/vol % of DODAB+$C_{14}SO_4$ in ethanol was poured slowly onto the fabric as the spin cycle continued. The RMC was measured after the spin cycle ended. Results are shown in the FIG. 14. As shown in FIG. 14, the RMC of the cotton fabric was reduced from 93.5% (for pure water) to 68.5% using the DODAB+$C_{14}SO_4$ applied to SDS. Compared to the standard of 150 ppm of TIDE® (the carryover amount of liquid TIDE® from the washing cycle into the final rinse cycle), the RMC was reduced from 87.75% to 68.5%. This is a reduction of almost 22% compared to the TIDE® carryover standard. However, this is a reduction of 26.7% compared to the pure water standard. As a result of the substantial reduction in RMC, the invention will conserve energy and save drying costs.

All documents cited herein are, in relevant part, incorporated herein by reference; the citation of any document is not to be construed as an admission that it is prior art with respect to the present invention. While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A process of extracting liquid from a fabric having a first content of liquid, comprising the steps of:
    creating a surfactant surface layer comprising at least one surfactant at an air-liquid interface of said liquid on said fabric, wherein said surface layer has a first surface tension;
    adding at least one co-surfactant different from said surfactant, said surfactant and said co-surfactant having substantial chain length compatibility, wherein said co-surfactant reduces said surface tension at said air-liquid interface to a reduced surface tension value, and
    subjecting the fabric to mechanical extraction for a period of time to reduce said liquid content of said fabric from said first content of liquid to a second liquid content.

2. The process of claim 1, wherein said surfactant includes a cationic or anionic surfactant, and said co-surfactant includes the other of said cationic or anionic surfactant.

3. The process of claim 2, wherein said process is performed in a washing machine.

4. The process of claim 1, wherein said co-surfactant comprises a non-ionic surfactant and said surfactant comprises an ionic surfactant.

5. The process of claim 1, wherein said co-surfactant comprises a ionic surfactant and said surfactant comprises a non-ionic surfactant.

6. The process of claim 1, wherein said co-surfactant is added in a solution comprising an organic solvent.

7. The process of claim 5, wherein said organic solvent comprises an alcohol.

8. The process of claim 1, wherein the surfactant comprises sodium tetradecyl sulfate and dioctyidecyldimethylammonium bromide in a molecular ratio of from about 1:10 to about 1:3; and said co-surfactant is delivered through a solution which comprises about 1 mM to about 5 mM sodium tetradecyl sulfate.

9. The process of claim 1, wherein said reduced surface tension value is from 5 mN/m to 20 mN/m.

10. The process of claim 1, wherein said reduced surface tension value is between 10 and 20 mN/m.

11. The process of claim 1, wherein said process is performed in a washing machine.

12. The process of claim 1, wherein said subjecting step comprises mechanical extraction which occurs during a transient low surface tension period, said transient low surface tension period beginning several seconds after said adding step.

13. The process of claim 1, wherein said substantial chain length compatibility comprises a chain length difference of <4.

* * * * *

UNITED STATES PATENT AND TRADEMARK OFFICE
CERTIFICATE OF CORRECTION

| | |
|---|---|
| PATENT NO. | : 7,520,013 B2 |
| APPLICATION NO. | : 11/316622 |
| DATED | : April 2, 2009 |
| INVENTOR(S) | : Daniel L. Carter and Dinesh O. Shah |

It is certified that error appears in the above-identified patent and that said Letters Patent is hereby corrected as shown below:

Column 3,
Line 30, "in a decrease the surface tension" should read --in a decrease of surface tension--.

Column 7,
Line 40, "While not be limited to a" should read --While not being limited to a--.
Line 60, "$c_8$-$c_{18}$ alkyl benzene" should read --$C_8$-$C_{18}$ alkyl benzene--.

Column 10,
Lines 7-8, "added as part of the one of the washing" should read --added as part of one of the washing--.
Line 42, "washing machine s according to" should read --washing machines according to--.

Column 12,
Lines 10-11, "(~13.5 MN for the" should read --(~13.5 mN for the--.
Line 64, "for longer times periods" should read --for longer time periods--.

Column 13,
Lines 3-4, "This example, unlike Examples 1-4 which were small scale studies, were repeated on a" should read --This example, unlike Examples 1-4 which were small scale studies, was repeated on a--.

Column 14,
Line 19, "7. The process of claim 5," should read --7. The process of claim 6,--.

UNITED STATES PATENT AND TRADEMARK OFFICE
CERTIFICATE OF CORRECTION

PATENT NO. : 7,520,013 B2
APPLICATION NO. : 11/316622
DATED : April 2, 2009
INVENTOR(S) : Daniel L. Carter and Dinesh O. Shah It is certified that error appears in the above-identified patent and that said Letters Patent is hereby corrected as shown below:

Lines 22-23, "dioctyidecyldimethylammonium" should read --dioctyldecyldimethylammonium--.

Signed and Sealed this

Fifteenth Day of September, 2009

David J. Kappos
*Director of the United States Patent and Trademark Office*